United States Patent [19]
Kipple et al.

[11] 3,837,717
[45] Sept. 24, 1974

[54] AIR BEARING

[75] Inventors: Harry P. Kipple, Penn Hills, Pa.; Virgil J. Cozzarin, Clarence, N.Y.

[73] Assignee: Westinghouse Electric Corporation, Pittsburgh, Pa.

[22] Filed: Aug. 7, 1972

[21] Appl. No.: 278,700

[52] U.S. Cl.................... 308/9, 308/36.3, 415/175
[51] Int. Cl. ........................................... F16c 17/16
[58] Field of Search ............. 308/9, 36.3, 122, 240; 415/175

[56] References Cited
UNITED STATES PATENTS

| | | | |
|---|---|---|---|
| 2,710,205 | 6/1955 | Brkich | 308/36.3 |
| 3,305,282 | 2/1967 | Arneson | 308/122 |
| 3,494,674 | 2/1970 | Muijderman et al. | 308/36.3 |
| 3,497,273 | 2/1970 | Muijderman et al. | 308/9 |
| 3,517,973 | 6/1970 | Hirs | 308/122 |

Primary Examiner—Charles J. Myhre
Assistant Examiner—Barry Grossman
Attorney, Agent, or Firm—R. D. Fuerle

[57] ABSTRACT

An air bearing is disclosed for use in a pump which moves fluidized solid resinous powders. The bearing comprises a shaft inside a casing of a low-friction thermally non-conductive material. The shaft is provided with keyways thereby preventing the powders from entering the bearing, melting, and jamming the pump.

12 Claims, 2 Drawing Figures

PATENTED SEP 24 1974　　　　　　　　　　　3,837,717

AIR BEARING

CROSS-REFERENCE TO RELATED APPLICATION

This application is related to application Ser. No. 64,443, filed Aug. 17, 17, 1970 now U.S. Pat. No. 3,693,842 by Virgil J. Cozzarin, Francis C. Kapperman, and Harry P. Kipple for an Aerated Powder Pump.

BACKGROUND OF THE INVENTION

A pump which moves solid powdered resinous materials in a fluidized state consists of a rotor which slowly turns in a housing. The rotor has a shaft which must be mounted in a fixed position in the center of the housing.

While conventional bearings in the mountings work perfectly well with powders such as dry cement, they are very unreliable when the pump is used to transport resinous powders. This is because resinous powders gradually work their way into the bearing of the mounting where the friction of the moving parts melts the powder and produces a gummy mess which prevents the rotor from turning. The pump must then be dismantled and cleaned.

SUMMARY OF THE INVENTION

We have found that if the shaft is provided with certain keyways and is mounted in a low-friction thermally non-conductive casing through which gas is admitted to the keyways, the powder can be prevented from entering the bearing or, if it does enter, can be wiped off the casing and blown out before it is melted by friction. The air bearing of this invention is inexpensive, easily made, and does not jam when used in pumps for resinous powders.

DESCRIPTION OF THE INVENTION

Figure 1:
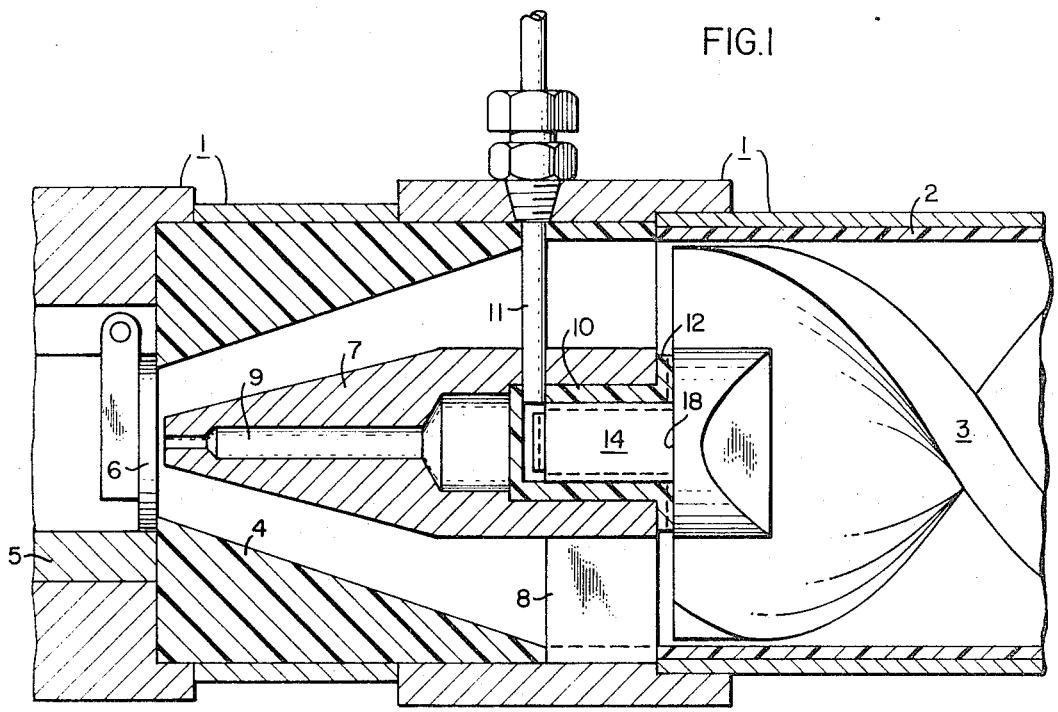
Figure 2:
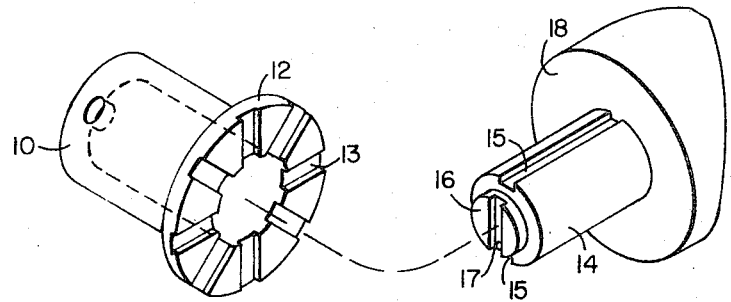

FIG. 1 is a side view in section of a pump for moving resinous powders using a certain presently preferred air bearing according to this invention; and FIG. 2 is an isometric view of the shaft and casing shown in FIG. 1, which together constitute a certain presently preferred embodiment of the air bearing of this invention.

In FIG. 1 a housing 1 is lined with a low-friction material 2 and contains a rotor 3. Housing 1 has a nozzle portion 4 and a terminal portion 5 (only part of which is shown) to which is connected a hose for directing the powder (not shown). Inside terminal portion 5 is a trap door 6 for stopping powder from moving into the hose once the pump is stopped.

Inside nozzle portion 4 is a mounting 7 held in place by three fins 8 (one shown). The mounting 7 contains a duct 9 to which gas is supplied by means not shown for blowing out powder. A casing 10 fits into the mounting and a tube 11 supplies gas to the bottom of the casing. The casing is of a low-friction material, which is thermally non-conductive, preferably polytetrafluoroethylene, although polyethylene, chlorotrifluoroethylene, etc. could also be used. However, brass and other metals should not be used as they are, for the purposes of this invention, thermally conductive.

Referring now to FIG. 2 as well as FIG. 1, casing 10 is provided with a flange 12 which has eight radially-extending keyways 13 across it. The shaft 14 of the rotor fits into the casing in close tolerance thereto (typically about 0.001 to about 0.002 inches). The shaft is provided with two keyways 15 running parallel to the shaft axis. The end 16 of the shaft has a reduced diameter and is provided with a keyway 17 across the shaft axis. The shaft is provided with a shoulder 18 which rides against flange 12. The shoulder is tapered and welded to the rotor. Keyways 13, 15 and 17 are preferably at least about 1/32 inch wide and 1/16 inch deep since particles may stick in smaller keyways. Also, they are preferably up to about ⅛ inch wide and ⅛ inch deep as larger keyways require too much air and are unnecessary. The number of keyways preferred is shown in the drawings except that 2 to 8 keyways 13 are preferred. The keyways are preferably straight as straight keyways are easier to machine, but they may also be curved or spiral.

In operating the pump the rotor turns slowly and fluidized powder is blown through the nozzle portion 4, past the trap door 6 and out the hose. Gas (typically air) is forced down tube 11 into casing 10 where it flows over end 16 off the shaft, across keyway 17, then through keyways 15 and 13. In doing so, the gas prevents the powder from entering the air bearing. In particular, the keyways 15 on the shaft continually wipe the inside surface of the casing, keeping it clean and free of powder. The gas pressure must exceed the pressure of the fluidized powder, of course, in order for it to flow out of the keyways. A typical gas pressure is about 10 to about 100 psi. The gas temperature is not critical, but it should be free of moisture and that is most easily accomplished by cooling of the gas and condensing out the moisture.

It should be noted that keyways 13 are regarded as essential to the successful operation of the air bearing, while other aspects of the bearing shown in the drawings are preferred and may be eliminated by appropriate design changes. For example, flange 12 and shoulder 18 can be eliminated. Tube 11 could enter the casing at its bottom rather than its side. Other design changes will also, no doubt, suggest themselves to those skilled in the art.

We claim:

1. An air bearing comprising
    1. a cup-shaped casing of a low-friction, thermally non-conductive material, said casing having an open end and a closed end;
    2. a shaft fitting within said casing in close tolerance thereto, said shaft having at least one keyway extending from said closed end of said casing to said open end of said casing; and
    3. a gas inlet in said casing directed at the end of said shaft.

2. An air bearing according to claim 1 wherein the end of said shaft is of a reduced diameter and has at least one keyway running across the shaft axis.

3. An air bearing according to claim 1 wherein said shaft is provided with a shoulder and said casing is provided with a flange at its outer edge which rides against said shoulder, said flange having radially-extending keyways facing said shoulder.

4. An air bearing according to claim 3 wherein the number of said keyways on said flange is 2 to 8.

5. An air bearing according to claim 1 wherein said tolerance is about 0.001 to 0.002 inch.

6. An air bearing according to claim 1 wherein said low-friction material is polytetrafluoroethylene.

7. An air bearing according to claim 1 wherein the number of said keyways on said shaft is 2.

8. An air bearing according to claim 1 wherein said keyways are about 1/32 to about 1/8 inch wide, and about 1/16 to about 1/8 inch deep.

9. In a pump for pumping a resinous solid powder in a fluidized state using a rotor which rotates within a housing, a mounting for said rotor comprising
   1. a cup-shaped casing of a low-friction, thermally non-conductive material having an open end and a closed end, and an outside diameter sufficiently less than the inside diameter of said housing to permit the flow of said fluidized powder therebetween;
   2. a shaft affixed to said rotor collinear with the axis thereof, rotatable within said casing in close tolerance thereto, and having a keyway therein extending from said closed end of said casing to said open end of said casing;
   3. means for admitting a gas stream to said closed end of said casing; and
   4. means for supporting said casing in the center of said housing.

10. A mounting according to claim 9 wherein said means for supporting said casing is at least one flat fin extending between said housing and said casing parallel to the axis of said shaft.

11. A mounting according to claim 9 wherein said means for admitting a gas stream is a tube extending from outside of said housing through said housing and said casing to the closed end of said casing.

12. A mounting according to claim 11 including means for supplying dry gas at a pressure of about 10 to about 100 psi to said tube outside of said housing.

* * * * *